(12) United States Patent
Cordova et al.

(10) Patent No.: US 8,973,897 B2
(45) Date of Patent: Mar. 10, 2015

(54) VALVE SEAT RETENTION PIN

(71) Applicant: Forum US, Inc., Houston, TX (US)

(72) Inventors: Tony Cordova, Humble, TX (US);
Michael Cornelssen, Spring, TX (US)

(73) Assignee: Forum US, Inc., Houston, TX (US)

( * ) Notice: Subject to any disclaimer, the term of this patent is extended or adjusted under 35 U.S.C. 154(b) by 0 days.

(21) Appl. No.: 13/733,556

(22) Filed: Jan. 3, 2013

(65) Prior Publication Data

US 2013/0168586 A1   Jul. 4, 2013

Related U.S. Application Data

(60) Provisional application No. 61/582,654, filed on Jan. 3, 2012.

(51) Int. Cl.
| | |
|---|---|
| *F16K 3/00* | (2006.01) |
| *F16K 3/02* | (2006.01) |
| *F16K 3/16* | (2006.01) |
| *F16K 3/30* | (2006.01) |
| *F16K 27/04* | (2006.01) |

(52) U.S. Cl.
CPC ... *F16K 3/02* (2013.01); *F16K 3/16* (2013.01); *F16K 3/30* (2013.01); *F16K 27/044* (2013.01)
USPC ........ 251/327; 251/328; 251/360; 137/15.23; 137/315.3

(58) Field of Classification Search
USPC ......... 251/300–303, 314–316, 326–328, 357, 251/359–360, 193, 214; 137/15.17, 137/15.22–15.23, 315.29–315.32, 137/527.7–527.8
See application file for complete search history.

(56) References Cited

U.S. PATENT DOCUMENTS

| | | | | |
|---|---|---|---|---|
| 683,695 | A | | 10/1901 | Lundbom |
| 710,986 | A | | 10/1902 | Lunken et al. |
| 880,463 | A | | 2/1908 | Paul |
| 953,100 | A | | 3/1910 | Nelson et al. |
| 1,679,734 | A | * | 8/1928 | Murphy ........................ 141/352 |
| 1,679,736 | A | * | 8/1928 | Murphy ........................ 141/353 |
| 2,255,593 | A | * | 9/1941 | Berger et al. ............ 137/614.04 |
| 2,282,491 | A | * | 5/1942 | Mathisen ........................ 169/11 |
| 2,401,377 | A | | 6/1946 | Smith |
| 2,412,685 | A | * | 12/1946 | Oldham et al. ............ 251/149.6 |
| 2,776,813 | A | * | 1/1957 | Blackman ..................... 251/197 |
| 2,810,543 | A | | 10/1957 | Bryant |
| 2,861,771 | A | | 11/1958 | Bryant |
| 2,882,009 | A | | 4/1959 | Bryant |
| 2,908,480 | A | | 10/1959 | Hamer |
| 3,121,553 | A | | 2/1964 | Grove |
| 3,175,802 | A | | 3/1965 | Bredtschneider |
| 3,189,319 | A | | 6/1965 | Bredtschneider |
| 3,209,778 | A | * | 10/1965 | Flohr ............................. 137/327 |
| 3,269,691 | A | * | 8/1966 | Meima et al. ................. 251/159 |

(Continued)

OTHER PUBLICATIONS

PCT International Search Report and Written Opinion for International Application No. PCT/US2013/020141 dated Mar. 22, 2013.

*Primary Examiner* — Marina Tietjen
(74) *Attorney, Agent, or Firm* — Patterson & Sheridan, LLP

(57) ABSTRACT

Embodiments described herein relate to a retention pin for retaining a seat member in the body pocket of a gate valve. Two retention pins may be installed on the outer circumference of the seat member. The seat member is inserted into the body pocket and rotated so that the retention pins are positioned in grooves in the body pocket and the seat member is retained in the body pocket.

7 Claims, 6 Drawing Sheets

(56) References Cited

U.S. PATENT DOCUMENTS

| | | | | |
|---|---|---|---|---|
| 3,301,523 | A | 1/1967 | Lowrey | |
| 3,414,233 | A | 12/1968 | Priese et al. | |
| 3,689,028 | A | 9/1972 | Dickenson et al. | |
| 3,765,647 | A | 10/1973 | Grove et al. | |
| 3,768,774 | A | 10/1973 | Baugh | |
| 3,823,911 | A | 7/1974 | Natho et al. | |
| 3,889,925 | A | 6/1975 | Brooks | |
| 3,893,652 | A | 7/1975 | Natho | |
| 4,017,058 | A | 4/1977 | Morrison | |
| 4,044,997 | A | 8/1977 | Schelat | |
| 4,081,174 | A | 3/1978 | Johnson et al. | |
| 4,113,228 | A | 9/1978 | Frye | |
| 4,116,419 | A | 9/1978 | Diehl et al. | |
| 4,162,058 | A | 7/1979 | Ellis | |
| 4,188,016 | A | 2/1980 | Whaley | |
| 4,192,483 | A | 3/1980 | Combes | |
| 4,193,581 | A | 3/1980 | Eilers | |
| 4,240,460 | A | 12/1980 | Alaniz | |
| 4,246,928 | A | 1/1981 | Burns et al. | |
| 4,258,743 | A * | 3/1981 | Dare et al. | 137/327 |
| 4,290,581 | A | 9/1981 | Moran et al. | |
| 4,313,458 | A | 2/1982 | Burns et al. | |
| 4,364,544 | A | 12/1982 | Kim | |
| 4,372,531 | A | 2/1983 | Rollins et al. | |
| 4,376,526 | A | 3/1983 | Freeman | |
| 4,377,273 | A | 3/1983 | Beson | |
| 4,401,292 | A | 8/1983 | Whaley | |
| 4,434,967 | A | 3/1984 | Vanderburg | |
| 4,483,511 | A | 11/1984 | Kushida et al. | |
| 4,519,582 | A | 5/1985 | Freeman | |
| 4,519,583 | A | 5/1985 | Lapinoja | |
| 4,541,449 | A | 9/1985 | Burke et al. | |
| 4,557,461 | A | 12/1985 | Gomi et al. | |
| 4,580,763 | A | 4/1986 | Velan | |
| 4,587,990 | A | 5/1986 | Pennell et al. | |
| 4,602,762 | A | 7/1986 | Koch et al. | |
| 4,605,199 | A | 8/1986 | Bonissone et al. | |
| 4,625,942 | A | 12/1986 | Nelson | |
| 4,629,161 | A | 12/1986 | Jones et al. | |
| 4,846,442 | A | 7/1989 | Clarkson et al. | |
| 4,869,450 | A * | 9/1989 | Takeda et al. | 251/315.05 |
| 4,878,651 | A | 11/1989 | Meyer, Jr. | |
| 5,000,223 | A * | 3/1991 | Scaramucci | 137/527.8 |
| 5,088,687 | A | 2/1992 | Stender | |
| 5,163,655 | A | 11/1992 | Chickering, III et al. | |
| 5,169,125 | A | 12/1992 | Bailey | |
| 5,170,989 | A | 12/1992 | Kemp | |
| 5,201,872 | A * | 4/1993 | Dyer | 251/172 |
| 5,205,536 | A | 4/1993 | Holec | |
| 5,320,327 | A | 6/1994 | Beson | |
| 5,338,006 | A | 8/1994 | McCutcheon et al. | |
| 5,377,955 | A | 1/1995 | Baker | |
| 5,413,310 | A | 5/1995 | Horvei | |
| 5,505,429 | A | 4/1996 | Bardini et al. | |
| 5,533,738 | A | 7/1996 | Hoffmann | |
| 5,542,645 | A | 8/1996 | Beson | |
| 5,624,101 | A | 4/1997 | Beson | |
| 5,676,348 | A | 10/1997 | Ungchusri et al. | |
| 5,727,775 | A | 3/1998 | Rodger et al. | |
| 5,836,570 | A | 11/1998 | Blenkush et al. | |
| 6,082,707 | A | 7/2000 | Hosie et al. | |
| 6,279,875 | B1 | 8/2001 | Chatufale | |
| 6,345,805 | B1 | 2/2002 | Chatufale | |
| 6,648,001 | B2 | 11/2003 | Chatufale | |
| 6,664,572 | B2 | 12/2003 | Chatufale | |
| 6,929,244 | B1 | 8/2005 | Law et al. | |
| 6,966,537 | B2 | 11/2005 | Sundararajan | |
| 7,032,880 | B2 | 4/2006 | Scaramucci | |
| 7,306,201 | B2 | 12/2007 | Lam | |
| 2003/0116742 | A1* | 6/2003 | Anderson et al. | 251/326 |
| 2009/0095934 | A1 | 4/2009 | Cain et al. | |
| 2011/0037010 | A1* | 2/2011 | Parks, Jr. | 251/328 |

\* cited by examiner

US 8,973,897 B2

VALVE SEAT RETENTION PIN

BACKGROUND OF THE INVENTION

1. Field of the Invention

Embodiments of the invention relate to gate valves. In particular, embodiments of the invention relate to the retention of a seat member in a gate valve body pocket using a pin or other retaining member that is disposed in a groove in the gate valve body pocket.

2. Description of the Related Art

A gate valve includes a gate that is moved by an operator or actuator in and out of the valve body, often by using a handwheel, to control the flow of fluid or gas through the gate valve. The gate valve also includes an annular or ring-shaped seat member that seals between the gate and a pocket (e.g. a recessed area) within the valve body, referred to as a valve body pocket. One or more seat members are typically housed in the valve body pocket and operate to form a seal with the gate. Seat members for gate valves are typically held in place through use of retainer rings (or plates). Alternatively, the seat members may be free floating within the gate valve and are supported by the gate and the valve body pocket.

Embodiments of the invention disclosed herein relate to replacing the retainer ring type of support. Such retainer rings are slightly larger in circumference than the seat member and are semi-elastic so that the seat member will be held in place within the valve body pocket through an interference fit. The downside of these retainer rings is that the elasticity of the retainer ring can decline over time, or if the retainer rings are used in an environment where significant amounts of lubricants are used, the firmness of the fit may decline over time and the seat members may not stay in place in applications involving high pressure. Therefore, there is a need for new and improved apparatus and methods of retaining seat members within the valve body pockets.

SUMMARY OF THE INVENTION

Embodiments of the invention described herein use one or more retention pins or other retaining structures to hold the seat member in place during installation of the gate. In one embodiment, the retention pins are installed in holes in the seat member that are positioned about 180 degrees apart on the outside circumference of the seat member. The valve body pocket (or additional seat member in which the seat member is to be installed according to one embodiment) includes two grooves disposed about 180 degrees apart to accommodate the retention pins. The seat member can be inserted by hand into the valve body pocket, with the pins disposed approximately 90 degrees from the center of the valve body pocket grooves, and rotated about 90 degrees so that the retention pins are disposed approximately in the center of the valve body pocket and the seat member is retained securely in the valve body pocket. In one embodiment, one or more pins and/or one or more grooves could be used. In one embodiment, the retention pins and seat members could be cast or milled together.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

It is contemplated that elements disclosed in the embodiments described below may be beneficially utilized on other embodiments without specific recitation.

Figure 1:
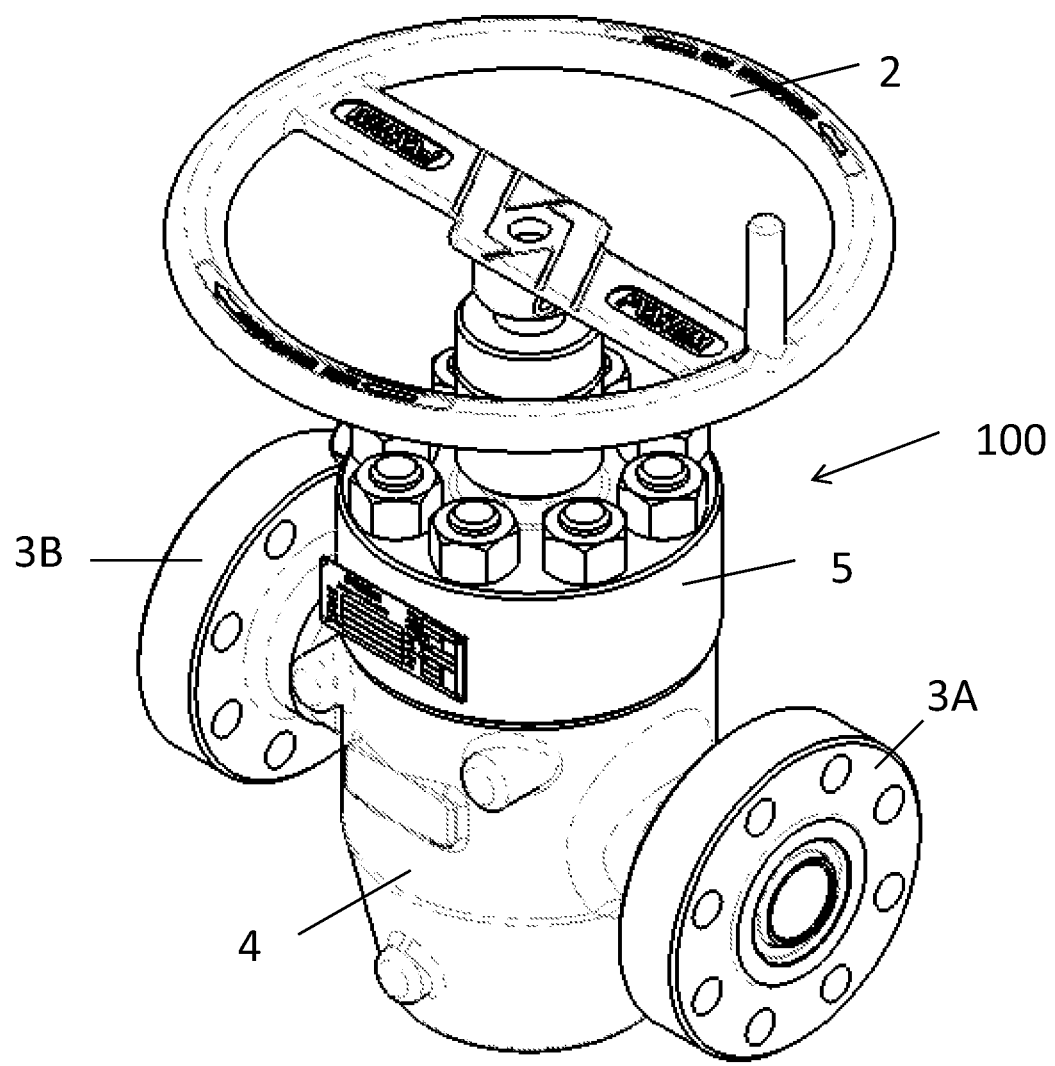
FIG. 1 is a drawing of a gate valve with a handwheel that is used to lower and raise a gate of the gate valve, according to one embodiment.

Embodiments of the invention relate to a device or structure for retaining a seat member for a gate valve in a body pocket. FIG. 1 shows an embodiment of a gate valve 100 having a handwheel 2 for opening and closing the gate valve 100. The gate valve 100 further includes (flanged) outlet connections 3A and 3B for connecting the gate valve 100 to pipe on each end, a valve body 4, and a bonnet 5.

Figure 2:
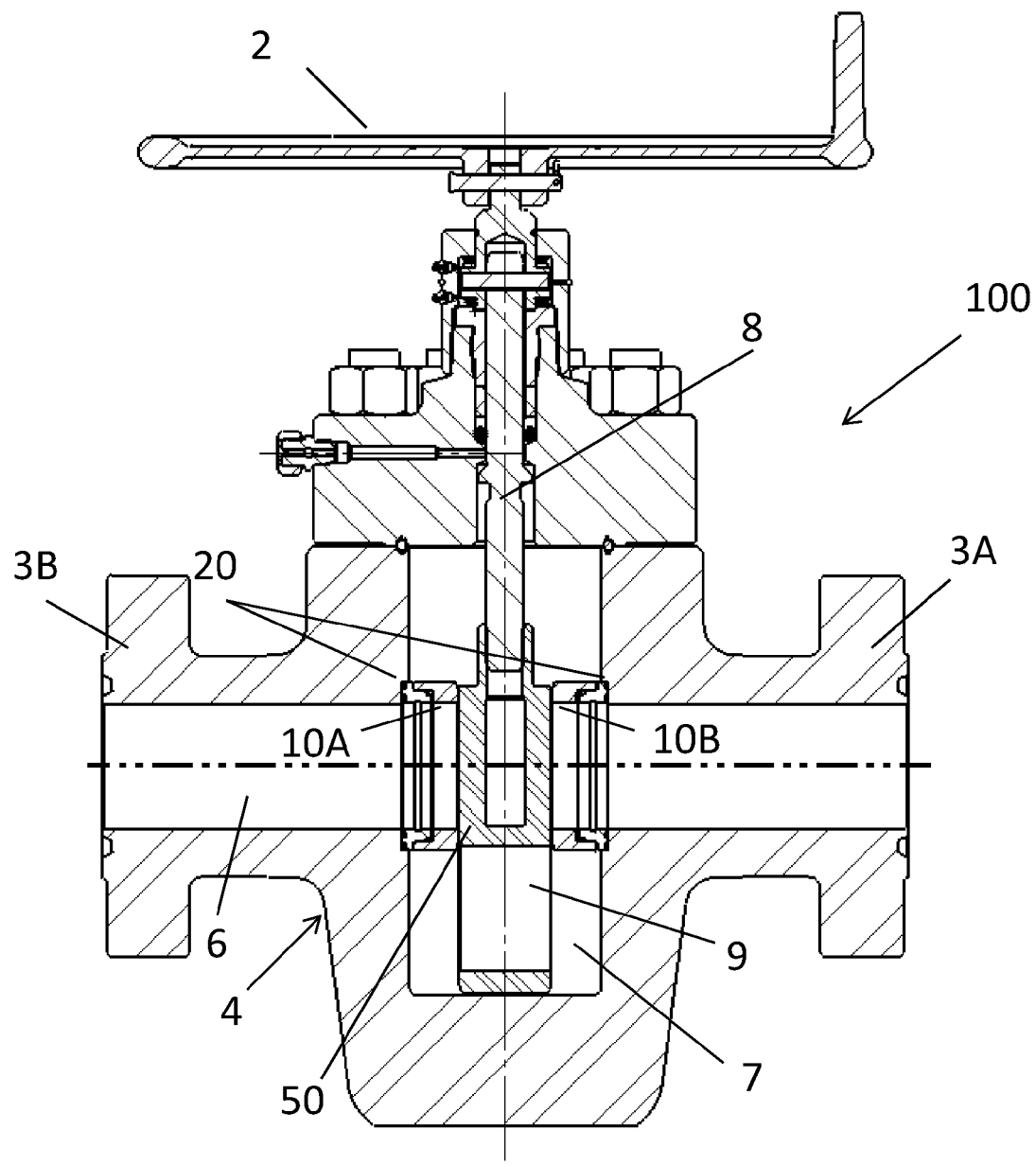
FIG. 2 is a cross section of the gate valve, showing the handwheel, stem, valve inserts, seat members, the gate, body pockets, and a through bore, according to one embodiment.

FIG. 2 shows a cross section of the gate valve 100, according to one embodiment of the invention. The valve body 4 includes a through bore 6 and body pockets 20 surrounding the through bore 6. A stem 8, which is connected to the hand wheel 2, raises and lowers a gate 50. The gate 50 has a generally rectangular shape with a hole 9 disposed through the middle of the gate 50, the hole 9 being of the same general circumference as the through bore 6. When the gate valve 100 is closed, the bottom of the gate 50 rests at the bottom of a body cavity 7 of the valve body 4. Seat members 10A and 10B provide a seal with the gate 50 when the gate 50 is closed.

Figure 3:
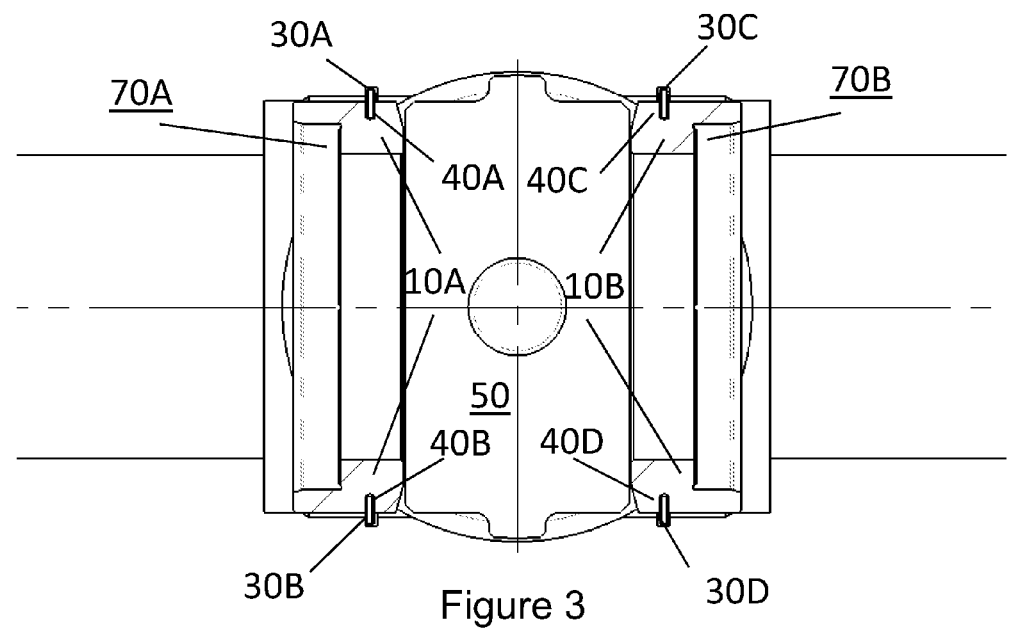
FIG. 3 is another cross section of the body of the gate valve of FIG. 2, showing the gate, seat members on each side of the gate, valve inserts between each seat member and the body pockets, and retention pins for each seat member disposed 180 degrees apart in grooves on each side of the body pocket on each side of the gate, according to one embodiment.
Figure 4:
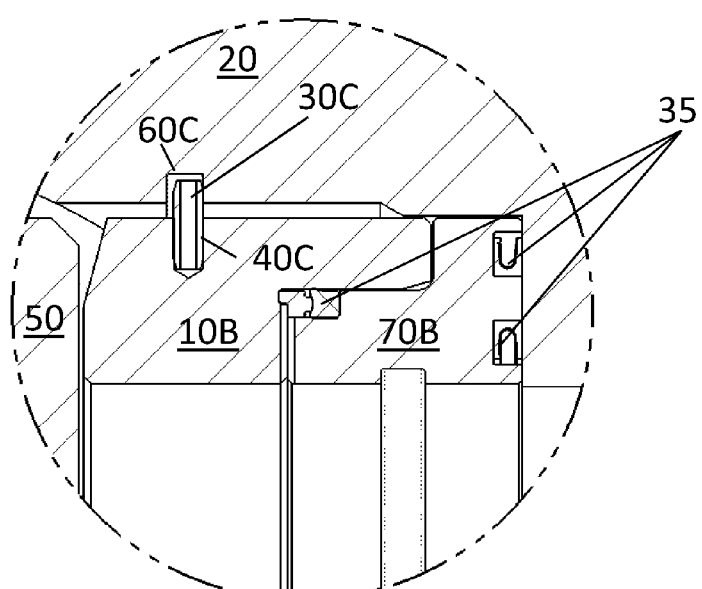
FIG. 4 is an enlarged view of a portion of the cross section illustrated in FIG. 3 of the valve insert, the seat member, the gate, and the body pocket; and shows how the retention pin is installed in a hole in the seat member and is disposed in the groove in the body pocket when the seat member is installed, according to one embodiment.

FIGS. 3 and 4 are more detailed cross sectional views of the seat members 10A and 10B, inserts 70A and 70B, and the gate 50. Seat members 10A and 10B each have two or more retainer pins 30A-D installed in holes 40A-D, respectively, in the outer circumference of the seat members 10A and 10B as shown in FIG. 3 and FIG. 4. If the seat members 10A and 10B are each designed with two pins 30A-B and 30C-D, respectively, the pins 30A-D can be disposed 180 degrees apart, as shown in FIGS. 3, 5, 6, 7, and 8.

Figure 6:
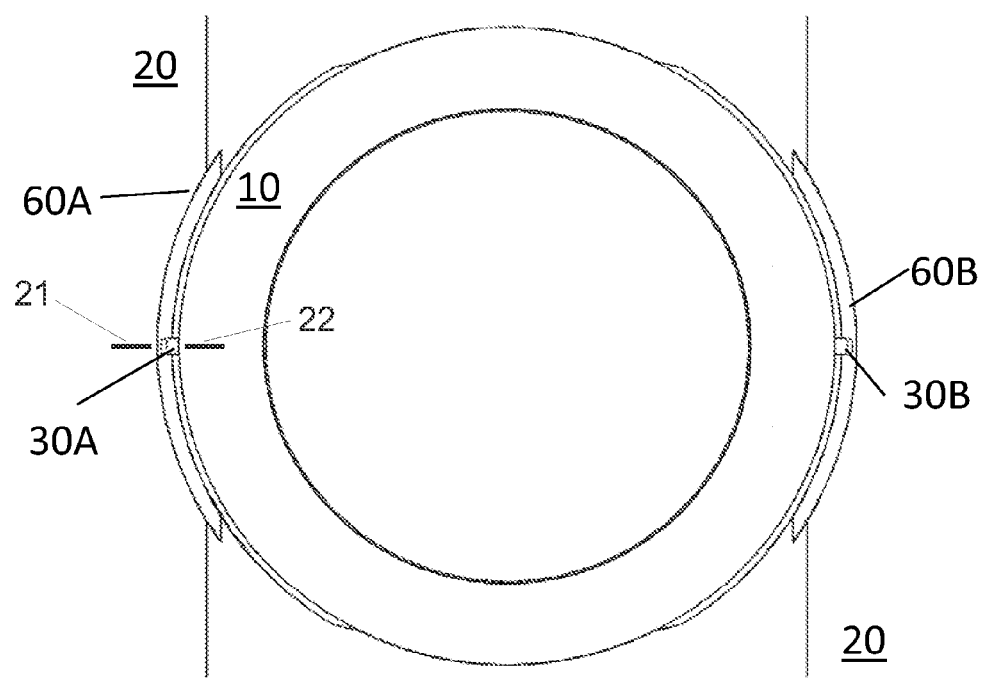
FIG. 6 is a cross section of the seat member and the body pockets with one wall of the body pocket grooves cut away, showing the seat member retaining pins installed 180 degrees apart in the holes in the seat member and disposed approximately in the center of the body pocket grooves, according to one embodiment.
Figure 7:
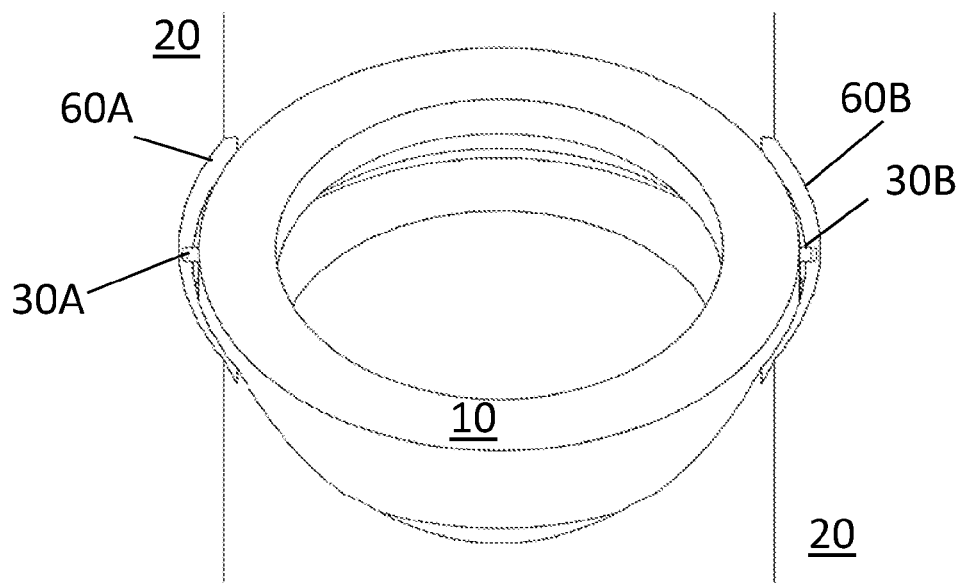
FIG. 7 shows the seat member of FIG. 6 from a different angle, with the retention pins of the seat member installed 180 degrees apart in the holes in the seat member and disposed approximately in the center of the body pocket grooves, according to one embodiment.

As shown in FIG. 4, when the seat member 10B is installed, pin 30C is disposed into a groove 60C in the body pocket 20. The other pins 30A, 30B, and 30D will each be installed in corresponding grooves, such as grooves 60A and 60B, as shown in FIGS. 3, 6, and 7. FIG. 4 shows a cross section of the gate 50, the seat member 10B, the insert 70B, and the body pocket 20 with pin 30C disposed in the groove 60C. Seat member 10B has a pin 30D as shown in FIG. 3 that similarly would be disposed in a groove 60. Seat member 10A, shown in FIG. 3, would be disposed against insert 70A with two pins 30A and 30B disposed in corresponding grooves 60A and 60B (illustrated in FIG. 6) in the body pocket 20. One or more seals 35, such as one-way seals, lip seals, spring and/or pressure energized seals, may be disposed between the seat member 10B and the insert 70B and/or between the insert 70B and the body pocket 20 for additional sealing.

Figure 5:
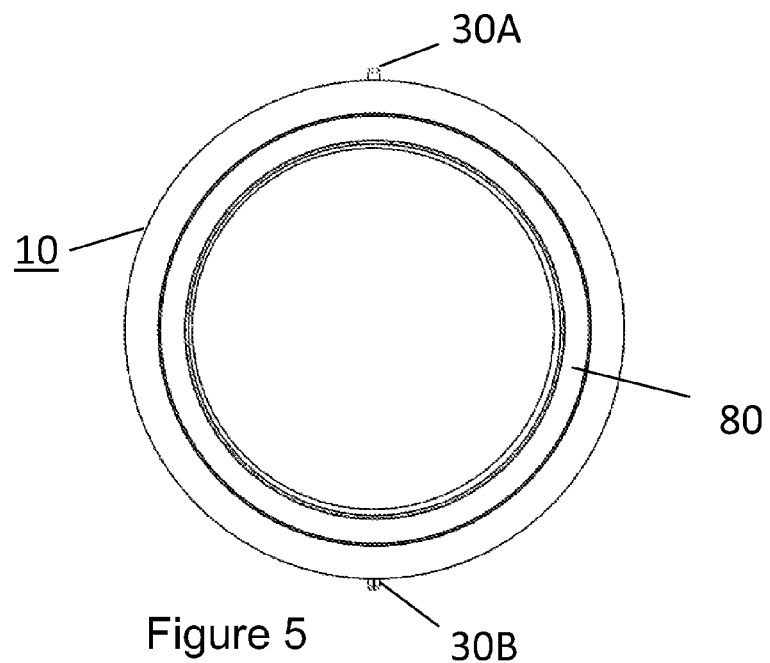
FIG. 5 is a view of the seat member and retention pins from the side of the seat member that faces the gate, according to one embodiment.

FIG. 5 is a view of the side of one seat member 10 that faces the gate 50 on each side of the gate 50. Pins 30A and 30B are disposed approximately 180 degrees apart in holes 40A and 40B (shown in FIG. 8) in the seat member 10. A face 80 of the seat member 10 provides a metal seal with the gate 50 on each side of the gate 50 when the gate 50 is in its closed position.

In one embodiment, the pins 30 and the seat member 10 could be cast or milled together, instead of having separate pins installed in holes within the seat members 10A and/or 10B. Instead of pins 30, other embodiments could use other retaining members/structures capable of securing the seat members 10A and 10B in the grooves 60.

FIG. 6 shows a cut away of one wall of the grooves 60A and 60B to show the pins 30A and 30B disposed in the grooves 60A and 30B, respectively, where the seat member 10 is in its installed position in the body pockets 20.

FIG. 7 shows a different view of the seat member 10 in its installed position with a cut away of one wall of the grooves 60A and 60B, in which pin 30A is disposed in groove 60A and pin 30B is installed in groove 60B (as shown in FIG. 6).

Figure 8:
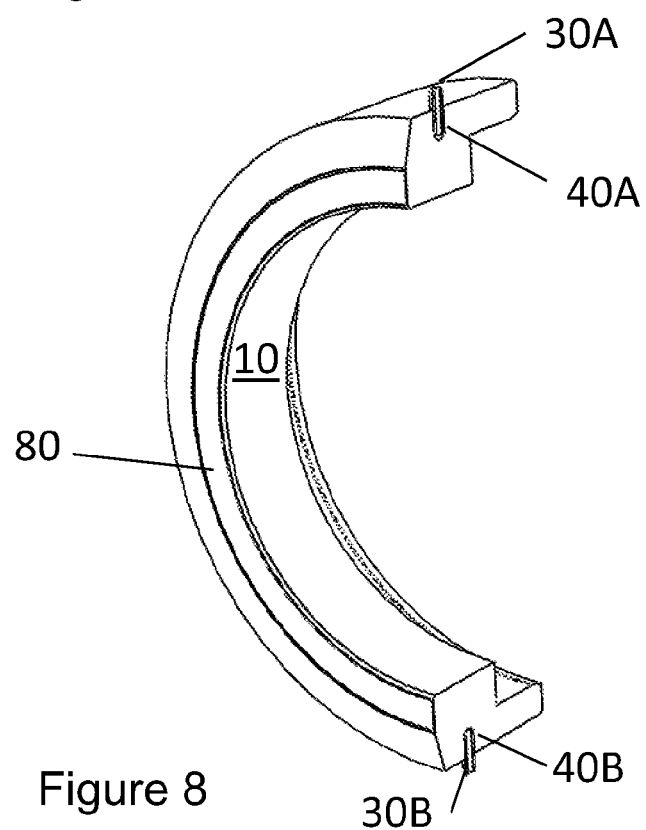
FIG. 8 shows a cross section of the seat member and retention pins positioned in holes in the seat member, according to one embodiment.

FIG. 8 is a cross section of the seat member 10. The pin 30A is disposed within the hole 40A within the seat member 10. The pin 30B is disposed approximately 180 degrees from the pin 30A. The pin 30B is disposed in the hole 40B in the seat member 10.

Figure 9:
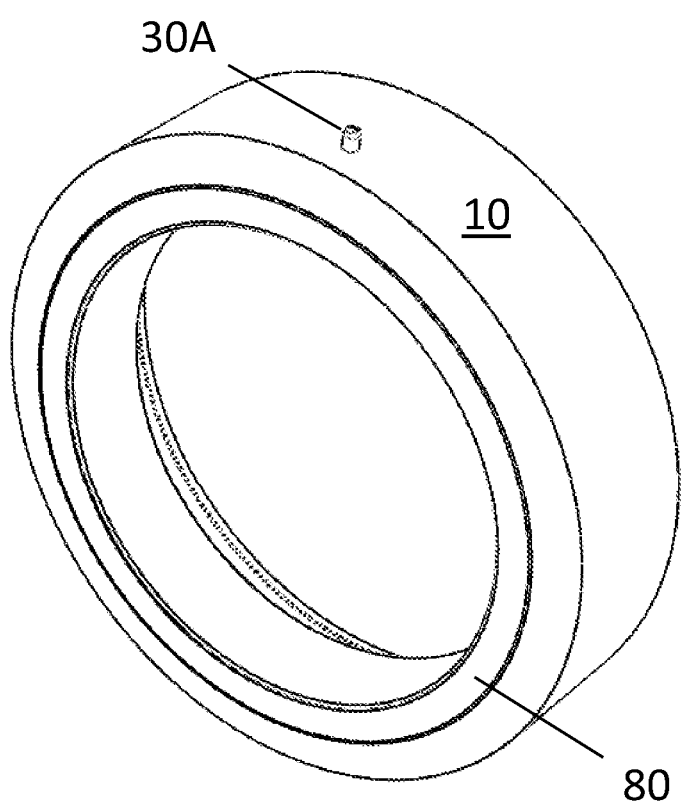
FIG. 9 shows the seat member and one retention pin from a different angle, according to one embodiment.

FIG. 9 is a perspective view of the seat member 10, with the pin 30A disposed in the hole 40A in the outer circumference of the seat member 10 (as shown in FIG. 8). The pin 30B is disposed approximately 180 degrees from the pin 30B but is not visible in FIG. 9. The face 80 of the seat member 10, also shown in FIG. 8, provides a metal-to-metal seal with the gate 50 when the gate 50 is closed.

The seat member 10 can be installed by inserting the seat member 10 into the body pocket 20, and rotating the seat member 10 approximately 90 degrees to the position shown in FIG. 3, FIG. 6, and FIG. 7. By rotating the seat member 10 one-quarter turn or 90 degrees clockwise or counter-clockwise, the pins 30 will be positioned approximately within the center of their respective groove 60A or 60B within the body pocket 20, and the seat member 10 will be retained within the body pocket 20.

To assist in positioning the pins 30 at the center of the grooves 60A and 60B in the body pockets 20, marks or notches 22 (as illustrated in FIG. 6) may be made on the portion of the seat member 10 that will be visible after installation to indicate the location of the pin 30. A mark or notch 21 (as illustrated in FIG. 6) also may be made on the surface of the body pocket 20 facing the gate 50 to indicate the location of the center of the groove 60A or 60B. These marks or notches 21, 22 from the body pocket 20 and the seat member 10 may be aligned to indicate that the pin 30 is in the center of the groove 60A or 60B.

The advantages of the embodiments of the invention disclosed herein over the prior art retaining rings is that the maintenance of the seat member in position is not dependent on a ring maintaining its elasticity or negatively affected by a decline in the firmness of fit in environments where significant amounts of lubricants are used. Moreover, the embodiments of the invention disclosed herein are suitable for high pressure applications because the pin and groove system maintains the seat member in place, even when subjected to high pressure.

While the foregoing is directed to embodiments of the invention, other and further embodiments of the invention may be devised without departing from the basic scope thereof.

What is claimed is:

1. A gate valve, comprising:
   a gate,
   a seat member,
   a body pocket,
   an insert disposed between the seat member and the body pocket,
   one or more seals disposed between the seat member and the insert,
   one or more seals disposed between the insert and the body pocket,
   a first retention pin removably positioned within a first hole formed in an outer circumference of the seat member such that the first retention pin does not extend through the entire thickness of the seat member when disposed in the first hole,
   a second retention pin removably positioned within a second hole formed in an outer circumference of the seat member such that the second retention pin does not extend through the entire thickness of the seat member when disposed in the second hole,
   a first groove within the body pocket, and
   a second groove within the body pocket,
   wherein the seat member is retained in the body pocket by the first retention pin disposed within the first or second groove within the body pocket and the second retention pin disposed within the first or second groove within the body pocket, and wherein the seat member is rotatable relative to the body pocket to position the first retention pin and the second retention pin within the first or second grooves of the body pocket.

2. The gate valve of claim 1, wherein the first retention pin and the second retention pin are disposed approximately 180 degrees apart on the outer circumference of the seat member.

3. The gate valve of claim 1, further comprising at least one of a mark or a notch on the body pocket, and at least one of a mark or a notch on the seat member for aligning at least one of the first retention pin or the second retention pin with a center of the first groove or the second groove.

4. The gate valve seat of claim 1, further comprising at least one of a notch or a groove for aligning at least one of the first retention pin or the second retention pin in the body pocket.

5. The gate valve of claim 1, wherein a center of the first retention pin is disposed approximately at a center of the first groove of the body pocket.

6. The gate valve of claim 1, further comprising at least one of a notch or a groove for aligning a center of the first retention pin in the first groove of the body pocket.

7. The gate valve of claim 1, further comprising a stem coupled to the gate, and a handwheel coupled to the stem configured to raise and lower the gate.

\* \* \* \* \*

UNITED STATES PATENT AND TRADEMARK OFFICE
CERTIFICATE OF CORRECTION

| | |
|---|---|
| PATENT NO. | : 8,973,897 B2 |
| APPLICATION NO. | : 13/733556 |
| DATED | : March 10, 2015 |
| INVENTOR(S) | : Cordova et al. |

Page 1 of 1

It is certified that error appears in the above-identified patent and that said Letters Patent is hereby corrected as shown below:

In Claims:

Column 4, Claim 4, Line 62, please delete "seat".

Signed and Sealed this
Twenty-fifth Day of August, 2015

Michelle K. Lee
*Director of the United States Patent and Trademark Office*